April 13, 1937.   W. F. MATHES   2,076,958
AGRICULTURAL IMPLEMENT
Filed Feb. 17, 1936   2 Sheets-Sheet 2
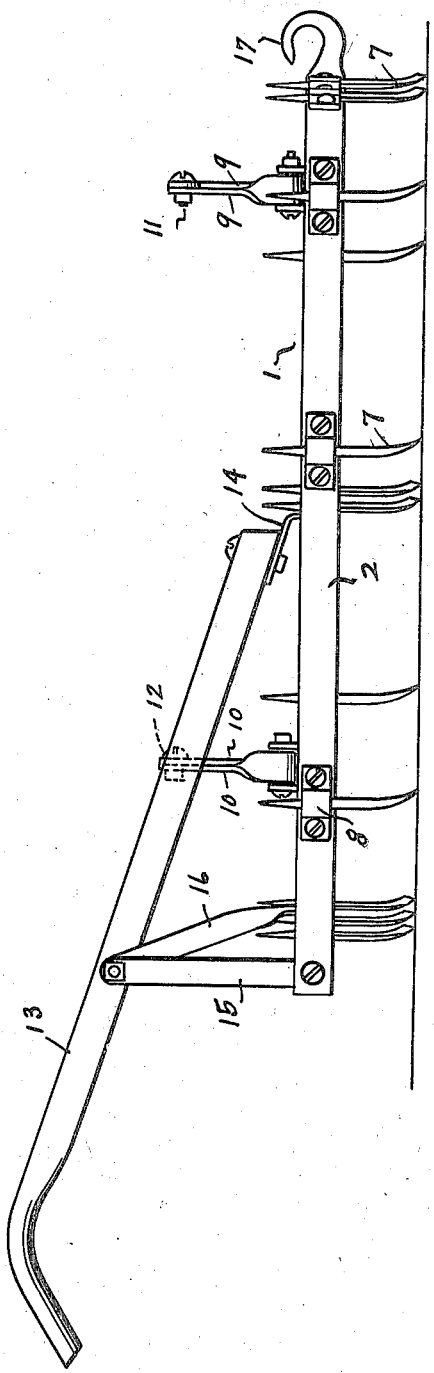
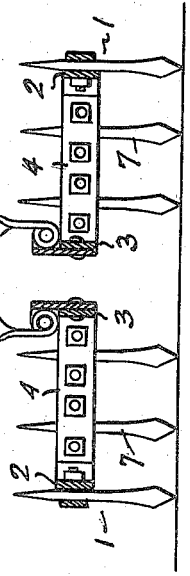

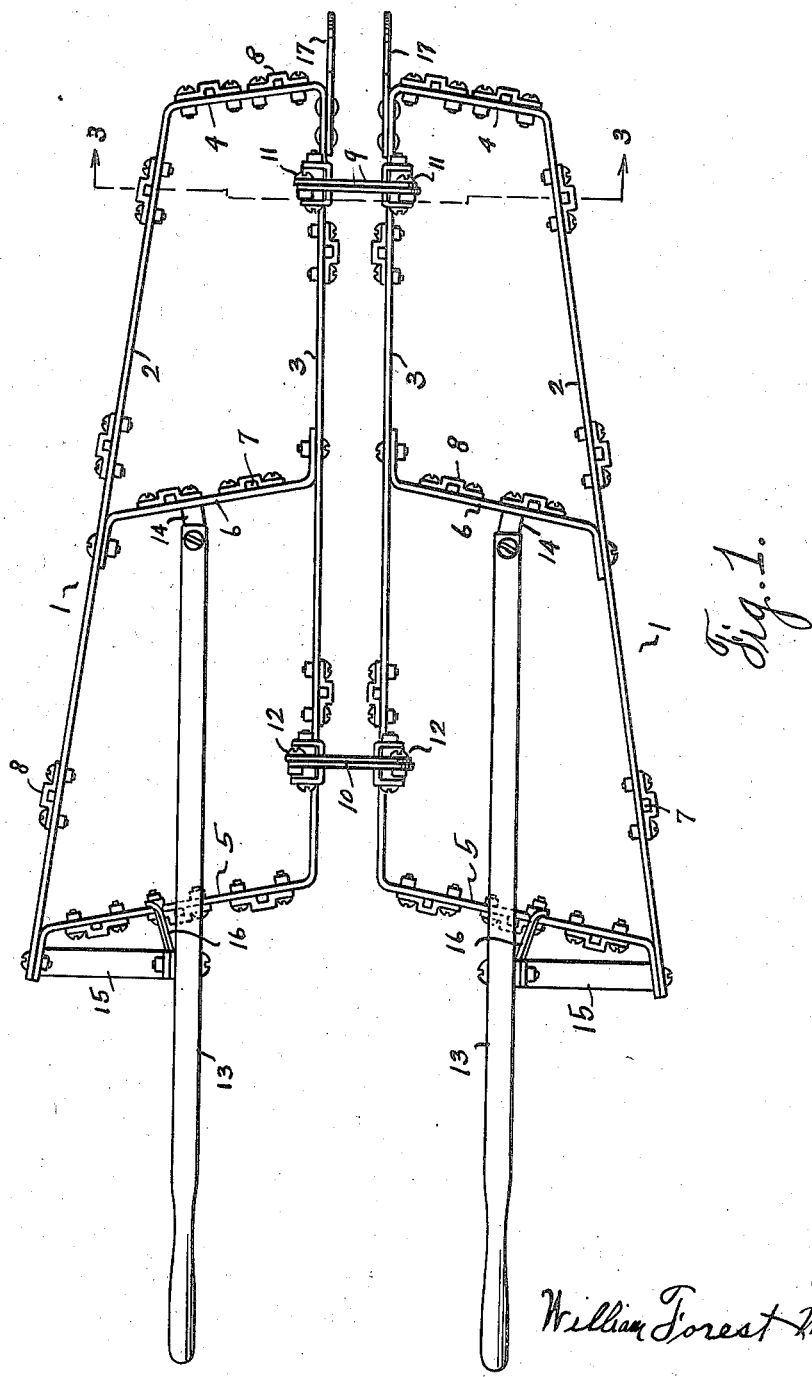

Patented Apr. 13, 1937

2,076,958

UNITED STATES PATENT OFFICE 2,076,958

AGRICULTURAL IMPLEMENT

William Forest Mathes, Hockley, Tex.

Application February 17, 1936, Serial No. 64,254

1 Claim. (Cl. 55—31)

This invention relates to an agricultural implement.

An object of the invention is to provide a harrow-type agricultural implement which is formed of sections flexibly connected together so that the harrow will more readily follow the contour of the surface of the ground.

Another object of the invention is to provide a harrow formed of sections which are adjustably connected together.

A further feature is to provide a harrow which is formed of sections pivotally connected together so that the sections may be independently reversed to render the teeth accessible for removing grass, roots, and the like, therefrom.

With the above and other objects in view, the invention has particular relation to certain novel features of construction, arrangement of parts, and use, an example of which is given in this specification and illustrated in the accompanying drawings wherein:

Figure 1 shows a plan view of the harrow.

Figure 2 shows a side view, and

Figure 3 shows a cross-sectional view taken on the line 3—3 of Figure 1.

Referring now more particularly to the drawings wherein like numerals of reference designate similar parts in each of the figures, the numerals 1, 1, designate the side frames, taken as a whole. Each frame comprises the side members 2, 3, connected by the end cross-bars 4, 5, and by the intermediate cross-bar 6. The side members 2, 3, as well as the cross-bars 4, 5, 6, converge forwardly, and each carries a row of harrow teeth 7 which are secured in place by the brackets 8. The side frames are flexibly connected together by means of the front and rear upstanding brackets, 9, 9, and 10, 10. These brackets are pivoted to the inner margins of the frame 1, 1, and their upper ends are overturned into coinciding relation, and said overturned portions are secured together by the bolts 11, 11, and 12, 12.

The overturned coinciding portions of the brackets are provided with a plurality of bolt holes, permitting adjustment so that the frames 1, 1, may be adjusted toward and from each other to vary the over-all width of the harrow.

The usual handles 13, 13, are provided. They are attached, at their forward ends, to the crossbars 6 by means of the straps 14 and are anchored in position by the upstanding braces 15, 15, and 16, 16.

The forward ends of the frames 1, 1, have the draft hooks 17.

The harrow hereinabove described has been designed for general agricultural purposes, although it is particularly useful for harrowing and cultivating ground that has become matted with roots and grass. It is very light, and at the same time durable.

Should the harrow become clogged with grass or roots, one section thereof can be turned upwardly from the ground and cleansed without the necessity of inverting the entire harrow at one time.

The drawings and description disclose what is now considered to be a preferred form of the invention by way of illustration only, while the broad principle of the invention will be defined by the appended claim.

What I claim is:

An agricultural implement comprising a pair of side frames, each composed of outside and inside side members, front, intermediate and rear cross bars connecting the side members of each frame, the inside side members of the respective frames being approximately parallel, front and rear upstanding brackets whose lower ends are pivoted to the respective inside side members, the upper ends of the brackets being overturned into coinciding relation and adjustably secured together, the lower ends of said brackets being pivoted to the frames whereby the frames may be independently swung on longitudinal axes.

WILLIAM FOREST MATHES.